Patented June 16, 1936

2,044,579

UNITED STATES PATENT OFFICE 2,044,579

PROCESS OF TREATING RESINOUS PRODUCTS

Glen M. Kuettel, Roselle, N. J., assignor to Du Pont Viscoloid Company, Wilmington, Del., a corporation of Delaware No Drawing. Application July 24, 1934, Serial No. 736,680

5 Claims. (Cl. 260—2)

This invention relates to a process of treating resinous products and, more particularly, to a process of treating solid masses comprising one or more compounds of the class including acrylic and alkacrylic acids, their homologues, and derivatives, which compound has been polymerized to a solid state at a temperature below the temperature of bubble formation. The invention particularly relates to such processes wherein the solid mass to be treated is essentially polymerized methyl alpha methacrylate.

Methyl alpha methacrylate monomer is a liquid having a boiling point of 100–101° C. which may be readily polymerized to a solid. Its preparation is disclosed in Rowland Hill U. S. Patent 1,980,483, granted Nov. 13, 1934, application filed November 3, 1932. This liquid, as well as the other liquid polymerizable compounds of the class mentioned above, may be polymerized in molds or other vessels to produce blocks, sheets, rods, tubes, semi-finished shapes, and the like, from which useful and ornamental articles may be formed by machining, polishing, and similar finishing operations. Since the appearance of these articles is of importance, it is necessary that the polymerization of these compounds be so carried out that the solid masses obtained are free from bubbles and other internal flaws.

These compounds may be readily polymerized to flawless solid masses if a relatively long period of time is allowed for the resin to set up, for example, 14–30 days. By employing polymerization catalysts, high temperatures, actinic light, and/or other means, the polymerization may be greatly speeded up but, in doing so, there is great danger, especially in polymerizing material in solid shapes such as herein under consideration, that the resulting product will contain internal bubbles or other flaws. Several methods have been devised for avoiding such defects as internal bubbles and yet permitting polymerization to proceed at a relatively rapid rate. All of these processes employ, as a basic principle, the avoidance of any temperature in any portion of the mass during polymerization which approaches the temperature of bubble formation. One process for accelerating the polymerization of these compounds in solid masses without the formation of internal bubbles, and the like, is disclosed in Loder application Serial No. 728,550, filed June 1, 1934, wherein the monomeric compound is heated to a point somewhat below the temperature of bubble formation to initiate polymerization and then withdrawing the exothermic heat resulting from the polymerization reaction at substantially the rate it is formed. A second method of polymerization is disclosed in Kuettel U. S. Patent 2,008,719, granted July 23, 1935, application filed July 24, 1934 entitled "Process of polymerization", wherein polymerization is effected by heating a mass of the monomeric compound to be polymerized until some portion thereof approaches the temperature of bubble formation, cooling the mass down so that no portion thereof substantially exceeds room temperature, again heating the mass as before and again cooling, these last two steps being repeated until the final polymerized product is obtained. A third method of polymerizing these compounds is disclosed in applicant's copending application Serial No. 736,678, filed July 24, 1934, entitled Preparation of cast articles, wherein the monomeric compound is polymerized in relatively thin layers, one upon the other, until the desired thickness is obtained. None of these processes, nor any other known process of polymerizing these compounds to obtain massive solid shapes free of internal flaws, involves the use of a polymerizing temperature as high as the temperature of bubble formation.

By the term "temperature of bubble formation" as used herein is meant that temperature at which some component of the mass being polymerized is volatilized, or dissolved air, or the like, is released in the mass. This temperature is not necessarily as high as the boiling point of the monomer being treated, since by-products of the polymerization, or other components, if any, of the mass may be volatilized at a temperature lower than the boiling point of the monomer, or dissolved gas may be released at a temperature lower than the boiling point of the monomer, in either case causing the formation of bubbles, possibly at a temperature appreciably below that at which the monomer itself would be volatilized.

Whereas the above described processes provide means for obtaining flawless massive shapes of these polymerized compounds, it is characteristic of these products that their hardness at room temperature is appreciably inferior to the hardness of the corresponding polymeric resins formed in solution or in dispersion and subsequently molded into solid massive shapes. Also the products obtained are characterized by a lower softening temperature than products made by molding the corresponding polymeric resins formed in solution or in dispersion. This comparative softness and low softening temperature are undesirable properties of these materials for use as the so-called turnery resins where the various shapes are machined, polished, and the like, in finishing.

An object of the present invention is to provide a simple and economical method of treating these solid masses comprising a compound of the class herein described, said compound having been polymerized at a temperature below the temperature of bubble formation, to give a flawless massive product. Other objects of the invention will be apparent from the description given hereinafter.

The above objects are accomplished according to the present invention by heating a solid mass comprising a compound from the class consisting of acrylic and alkacrylic acids, their homologues, and derivatives, said compound having been polymerized to the solid state at a temperature below the temperature of bubble formation, to a temperature at least approximately as high as the boiling temperature of the compound in monomeric form until no further appreciable increase in the hardness of the mass at room temperature or no further appreciable increase in the softening point of the mass takes place. In a preferred form the invention comprises treating a solid flawless mass consisting essentially of methyl alpha methacrylate polymerized to the solid state at a temperature below the temperature of bubble formation, by subjecting said mass to a temperature of 95–115° C. until no further appreciable increase in the hardness of the mass at room temperature or no further appreciable increase in the softening point of the mass takes place. The time of heating usually approximates 24 hours.

The present invention resides in the unexpected discovery that the hardness and softening point of these so-called turnery resins obtained by polymerizing the compounds herein under consideration at a temperature below the temperature of bubble formation in order to get a flawless, bubble free product, may be appreciably increased by heating the polymerized product to a temperature at least approximating the boiling temperature of the monomer, and preferably somewhat in excess of same, for a period in the neighborhood of 24 hours, and that such treatment in no way causes the formation of internal bubbles or other visual flaws in the product if the product was flawless at the commencement of the treatment.

The following examples are given in order to illustrate specific embodiments of the invention:—

*Example 1*.—Liquid methyl alpha methacrylate monomer is poured into a lead mold of inside diameter 0.75″ and of length 20″, which mold is placed in a vertical position in an oven maintained at from 80–84° C. and is held therein for 3 hours. At the end of this period the temperature in local portions of the mass will have been found to have risen to a point close to the temperature of bubble formation. The mold is then removed from the oven and allowed to cool to approximately room temperature. Three hours after its removal from the oven it will be found that the mass throughout is cooled in all portions thereof and it is then again returned to the oven for a second period of three hours at the same oven temperature. This procedure, upon being repeated for a total of five complete heating and cooling stages, will give a polymerized resin which, upon removal from the mold, will be an exceptionally clear rod free of bubbles and other internal flaws.

The manufacture of the rod as described above is in accordance with the invention described in said Kuettel U. S. Patent 2,008,719. According to the present invention, this rod is then heated for 24 hours at a temperature kept between 95° C. and 115° C. At the end of this time, it will be found that the rod is still flawless and is appreciably harder and has an appreciably higher softening point. Extending the heat treatment further will make substantially no difference in either the hardness or softening point of the rod.

*Example 2*.—A mold having a cavity in the form of a tube of outside diameter 3.5″ and inside diameter 3.0″ and height 6″, is filled with liquid methyl alpha methacrylate monomer and placed for 3½ hours in an oven at a temperature of 70° C. It is then removed and cooled to room temperature for 3 hours. It is then alternately heated for 2½ hours and cooled for 3 hours at the same respective temperatures for 7 additional cycles. The tube of polymerized methyl alpha methacrylate removed from the mold is crystal clear and free from bubbles and other internal flaws.

The preparation of the tube as given above is in accordance with said Kuettel U. S. Patent 2,008,719. Proceeding according to the present invention, the tube is left in the mold and placed in an oven held at a temperature of 115° C. for 24 hours. Upon removal from the oven it will be found that the tube is still flawless and that the hardness and softening temperature have been appreciably increased.

*Example 3*.—Methyl alpha methacrylate monomer is polymerized by the method of alternate heating and cooling as set forth in the above examples until it reaches a point where, upon continued exposure at a temperature of 70° C., no bubbles are formed. It then possesses a softening temperature of about 90° C., definitely softer than the polymer of the same compound made by a solution or emulsion method and molded in a comparable massive form. Further, it has inferior machining qualities, as, for example, on the lathe where it comes under the tool.

The mass of polymerized methyl alpha methacrylate in the mold is now exposed to a temperature of 100° C. for 24 hours. The mass now has a softening temperature of 110° C. Furthermore, it has greater hardness and distinctly improved machining qualities. Further extension of the time of the heat treatment has little effect, as shown by the data below:—

| Hours in oven at 100° C. | Softening temperature | Scleroscope hardness |
|---|---|---|
| 0 | 90° C. | 71 |
| 24 | 110 | 79 |
| 48 | 112 | 78 |
| 96 | 114 | 79 |

The scleroscope hardness is determined as shown in the Encyclopedia Britannica, 14th Edition, vol. 11, page 189, and the hardness numbers given are in terms of the Standard Shore Scale for the scleroscope.

It will be understood that the above examples are merely illustrative and that the present invention is applicable not only to the treatment of methyl alpha methacrylate polymerized to a solid at a temperature below the temperature of bubble formation, but also to the class of compounds consisting of acrylic and methacrylic acids, their homologues, and derivatives, polymerized to the solid state in the same manner.

Among the compounds suitable for use in this invention may be mentioned acrylic and alkacrylic acids such as methacrylic and ethacrylic acids, their esters, derivatives, and homologues, such as the nitriles, amides, substituted alkyl and aryl amides of these acids, as well as, more particularly, the esters of the alkacrylic acids as the alkyl esters of methacrylic and ethacrylic acids. Specifically may be mentioned monomeric methyl alpha methacrylate, ethyl alpha methacrylate, methyl alpha ethacrylate, and ethyl alpha ethacrylate. This class of compounds has the common characteristic of being liquids in monomeric form at room temperature and atmospheric pressure and polymerizing to solid thermoplastic resins. The present invention is also applicable to mixtures and interpolymers of these compounds. The particular temperature and duration of the heat treatment employed in the present process will vary with respect to the particular polymerized compound being treated. In all instances it will at least be approximately as high as the boiling point of the compound in monomeric form, not more than 5° C., for example, below the boiling temperature. As an illustration, the temperature with respect to methyl alpha methacrylate would be at least 95° C., since methyl alpha methacrylate boils at 100-101° C.

As a general rule, the upper limit of the temperature will be governed by practical considerations. The higher the temperature used, the shorter will be the time to effect substantially optimum hardness and softening point of the mass being treated. The temperature must in no case be so high that discoloration of the mass may occur. Also, if the mass is being treated after removal from the mold, or other supporting vessel, the temperature must not appreciably exceed the softening temperature of the mass or it will lose its shape. Where polymerized masses are obtained of particularly low softening temperature, appreciably below the boiling point of the monomeric compound, it will not be feasible to treat them according to the present invention after removal from the mold, or other supporting vessel. In commercial operation, where neither a split nor tapered mold is employed, it is of considerable advantage to treat the polymerized mass according to the present invention without removing from the mold, because this heat treatment causes some shrinkage, thus facilitating the removal of the mass from the mold. A further consideration as to the upper limit of the temperature, is the effect of higher temperatures on components of the mass being treated other than the polymerized compound. For example, these masses frequently contain an organic dye as coloring matter, which dye is sensitive to high temperatures. It has been found that temperatures in excess of 115° C. are of little advantage in treating methyl alpha methacrylate and, although higher temperatures may be used, difficulties are apt to be encountered with respect to discoloration of the mass.

In commercial operations where a plurality of identical masses as to composition, size, and shape are to be treated, specimens will be treated at the desired temperature and taken out periodically to be tested for hardness and/or softening temperature to establish the exact optimum duration of the heat treatment. While those skilled in this art can readily carry out the present invention from the disclosure herein given, it will be appreciated that the optimum temperature and duration of the heat treatment for any particular composition in a certain size and, to some extent, shape, can only be determined by a slight amount of preliminary testing.

The present invention provides a practical and economical means of transforming resins of the class described to a condition in which their softening temperatures and hardness are at a maximum and the machining qualities of the resinous masses are improved. Furthermore, it provides a means of facilitating the removal of these resins from the molds in which they have been prepared and makes it possible to use molds having no taper.

The invention is applicable to the treatment of resins in various massive shapes ordinarily required for use as turnery resins and the process may be used in treating any resins of the class herein described which have been polymerized in massive shapes at a temperature lower than the temperature of bubble formation. Obviously the invention is not only applicable to compositions consisting of these polymerizable compounds but also to compositions containing these compounds together with coloring matter, either soluble or insoluble, fillers, plasticizers, and various other modifying components such as may occur to one skilled in the art.

As many apparently widely different embodiments of this invention may be made without departing from the spirit and scope thereof, it is to be understood that the invention is not limited to the specific embodiments thereof except as defined in the appended claims.

I claim:

1. Process of treating a cast massive piece of a compound from the class consisting of acrylic and alkacrylic acids, their homologues, and derivatives, said compound having been polymerized to the solid state at a temperature below the temperature of bubble formation to give an internally substantially flawless massive piece, which comprises heating said massive piece at a temperature at least approximately as high as the boiling temperature of the compound in monomeric form until no further appreciable increase in the hardness of the massive piece at room temperature or no further appreciable increase in the softening point of the mass takes place.

2. Process of treating a cast massive piece of a compound from the class consisting of acrylic and alkacrylic acids, their homologues, and derivatives, said compound having been polymerized to the solid state at a temperature below the temperature of bubble formation to give an internally substantially flawless massive piece, which comprises heating said massive piece at a temperature slightly in excess of the boiling temperature of the compound in monomeric form until no further appreciable increase in the hardness of the massive piece at room temperature or no further appreciable increase in the softening point of the mass takes place.

3. Process of treating a cast massive piece of methyl alpha methacrylate polymerized to the solid state at a temperature below the temperature of bubble formation to give an internally substantially flawless massive piece, which comprises heating said massive piece at a temperature at least approximately as high as the boiling temperature of methyl alpha methacrylate in monomeric form until no further appreciable increase in the hardness of the massive piece at room temperature or no further appreciable increase in the softening point of the mass takes place.

4. Process of treating a cast massive piece of methyl alpha methacrylate polymerized to the solid state at a temperature below the temperature of bubble formation to give an internally substantially flawless massive piece, which comprises heating said massive piece at a temperature of 95–115° C. until no further appreciable increase in the hardness of the massive piece at room temperature or no further appreciable increase in the softening point of the mass takes place.

5. Process of treating a cast massive piece of methyl alpha methacrylate polymerized to the solid state at a temperature below the temperature of bubble formation to give an internally substantially flawless massive piece, which comprises heating said massive piece at a temperature of 95–115° C. for approximately 24 hours.

GLEN M. KUETTEL.